US009505072B2

(12) United States Patent
Barker (10) Patent No.: US 9,505,072 B2
(45) Date of Patent: Nov. 29, 2016

(54) SYSTEMS AND METHODS FOR AUDITING OPTIMIZERS TRACKING LUMBER IN A SAWMILL

(75) Inventor: Earl Barker, Enumclaw, WA (US)

(73) Assignee: Weyerhaeuser NR Company, Seattle, WA (US)

( * ) Notice: Subject to any disclaimer, the term of this patent is extended or adjusted under 35 U.S.C. 154(b) by 1254 days.

(21) Appl. No.: 13/366,028

(22) Filed: Feb. 3, 2012

(65) Prior Publication Data

US 2013/0199672 A1   Aug. 8, 2013

(51) Int. Cl.
G06G 7/48 (2006.01)
B23D 59/00 (2006.01)
B27B 1/00 (2006.01)

(52) U.S. Cl.
CPC ............. *B23D 59/008* (2013.01); *B27B 1/007* (2013.01)

(58) Field of Classification Search
None
See application file for complete search history.

(56) References Cited

U.S. PATENT DOCUMENTS

| | | |
|---|---|---|
| 3,890,509 A | 6/1975 | Maxey |
| 3,931,589 A | 1/1976 | Aisenberg et al. |
| 4,139,035 A | 2/1979 | Bystedt et al. |
| 4,188,544 A | 2/1980 | Chasson |
| 4,221,974 A | 9/1980 | Mueller et al. |
| 4,437,367 A | 3/1984 | Hauser |
| 4,524,812 A | 6/1985 | Murphy |
| 4,541,722 A | 9/1985 | Jenks |
| 4,691,601 A | 9/1987 | Peddinghaus |
| 4,691,751 A | 9/1987 | Komulainen |
| 4,916,629 A | 4/1990 | Bogue et al. |
| 4,926,917 A | 5/1990 | Kirbach |
| 5,056,922 A | 10/1991 | Cielo et al. |
| 5,892,808 A | 4/1999 | Goulding et al. |
| 5,897,800 A | 4/1999 | Sawai et al. |
| 5,946,995 A | 9/1999 | Michell et al. |
| 5,949,086 A | 9/1999 | Reponen et al. |
| 6,026,689 A * | 2/2000 | Snyder .................... B27B 1/00 73/597 |
| 6,041,683 A | 3/2000 | Timperi et al. |
| 6,062,280 A | 5/2000 | Newnes et al. |
| 6,064,035 A | 5/2000 | Toller et al. |

(Continued)

OTHER PUBLICATIONS

Lin Development of A 3D Log Processing Optimization System for Small-Scale Sawmills to Maximize Profits and Yields From Central Appalachian Hardwoods Dissertation, Davis College of Agriculture, Natural Resources, and Design, West Virginia University, 2011.*

(Continued)

*Primary Examiner* — Omar Fernandez Rivas
*Assistant Examiner* — Cuong Luu
(74) *Attorney, Agent, or Firm* — Perkins Coie LLP (57) ABSTRACT

An audit system and method audits operation of an optimizer system in a mill, for example auditing operation of a cant optimizer which optimizes sawing patterns. The audit system may be completely independent of the optimizer. For example, the audit system may acquire information (e.g., optically) indicative of a geometry of boards downstream from a piece of equipment such as a gangsaw. The audit system may computationally reconstruct a cant from which the boards were sawn, determine an outside dimension indicative of wane, and simulate alternative sawing patterns, determining a theoretical amount of recovery that would have resulted from each and comparing such to actual recovery from the log or cant. Alternative sawing patterns may take into account various wane rules and comparison may take into account current demand and/or prices for dimensional lumber.

21 Claims, 7 Drawing Sheets

(56) References Cited

U.S. PATENT DOCUMENTS

| | | | |
|---|---|---|---|
| 6,094,269 A | 7/2000 | Ben-Dove et al. | |
| 6,127,649 A | 10/2000 | Toller et al. | |
| 6,333,795 B1 | 12/2001 | Kaji | |
| 6,382,062 B1 | 5/2002 | Smith | |
| 6,425,346 B1 | 7/2002 | Birk | |
| 6,437,357 B1 | 8/2002 | Weiss et al. | |
| 6,449,585 B1 | 9/2002 | Hyun et al. | |
| 6,463,402 B1 | 10/2002 | Bennett et al. | |
| 6,466,305 B1 | 10/2002 | McBain | |
| 6,598,477 B2 | 7/2003 | Floyd | |
| 6,618,155 B2 | 9/2003 | Metcalfe et al. | |
| 6,681,672 B2 | 1/2004 | Myrfield | |
| 6,690,990 B1* | 2/2004 | Caron | B27G 1/00 144/363 |
| 6,757,058 B1 | 6/2004 | Carman et al. | |
| 6,773,552 B1 | 8/2004 | Albert et al. | |
| 6,988,439 B2 | 1/2006 | Liu et al. | |
| 7,134,465 B2 | 11/2006 | Herring et al. | |
| 7,200,458 B2 | 4/2007 | Carman et al. | |
| 7,227,165 B2 | 6/2007 | Hubert et al. | |
| 7,308,921 B1 | 12/2007 | Brewer, Sr. | |
| 7,406,190 B2 | 7/2008 | Carman et al. | |
| 7,426,422 B2 | 9/2008 | Carman et al. | |
| 7,660,443 B2 | 2/2010 | Azuma et al. | |
| 7,853,349 B2 | 12/2010 | Barker | |
| 2001/0034561 A1 | 10/2001 | Myrfield | |
| 2004/0250917 A1 | 12/2004 | Kennedy et al. | |
| 2005/0013472 A1 | 1/2005 | Gauthier | |
| 2006/0053990 A1 | 3/2006 | Barker | |
| 2007/0263918 A1* | 11/2007 | Jenya | B27B 1/007 382/141 |
| 2008/0029511 A1 | 2/2008 | Barker et al. | |
| 2009/0095377 A1* | 4/2009 | Barker | B23Q 17/20 144/357 |
| 2009/0095378 A1 | 4/2009 | Barker | |
| 2009/0255607 A1* | 10/2009 | Barker | B23D 59/008 144/357 |
| 2012/0227866 A1* | 9/2012 | Barker | B23Q 17/20 144/357 |

OTHER PUBLICATIONS

Lundahl Licentiate Thesis, Optimized Processes in Sawmills Lulea University of Technology, 2007.*
"Automatic On-Line Control Solution for Multiple Parallel Sawn Pieces in Log Breakdown and Resaw," Inx Systems SeeCon SC2000 Real-Time Lumber Size Control System, Inx-Systems, Inc., Cumming, Georgia, 2 pages.
"Inx SeeCon SC2000 & SC2000L: True Real-Time Lumber Size Control System—Technical Considerations for Successful Installation," Inx Systems Technical Information, Inx-Systems, Inc., Cumming, Georgia, 2002, 8 pages.
"Inx SeeCon SC2000 On-Line Lumber Size Control System: Payback Time & Return-on-Investment," Inx-Systems, Inc., Cumming, Georgia, Dec. 12, 2001, 8 pages.
"Modern Mill-Wide Lumber Size Control: Methods and Components of a Complete Lumber Size Control System," Inx Systems Educational Information, Inx-Systems, Inc., Cumming, Georgia, 2002, 7 pages.
"Sawmill Operator's Guide to Greater Profits: Everything Profit-Conscious Management Needs to Know about New True Real-Time Lumber Size Control," Inx Systems Managerial Information, Inx-Systems, Inc., Cumming, Georgia, 2002, 13 pages.
"SeeCon True Real-Time Lumber Size Control System—Frequently Asked Questions," 2002, 7 pages.
"SeeCon: MillWide Lumber Size Control" USNR Brochure, 2004, 2 pages.
"Size Does Matter"—Perceptron—USNR News, May 2003:1-3.
Vuorilehto, "Benefits of Continuous Dimension Control in Sawmills," Inx-Systems, Inc., Cumming, Georgia, 9 pages.
Vuorilehto, "Manual Lumber Measurement Too Slow for Today's Sawmills: Computerized Measures of Lumber After Blade or Setup Changes Gather Far More Accurate Data than Manual Methods; Fixing Errors is Faster," Inx-Systems, Inc., Cumming, Georgia, 8 pages.
Vuorilehto, "New Inx Saw Blade Manager Software Optimizes Production Volume and Quality; Minimizes Downtime and Blade Costs," Inx-Systems, Inc., Cumming, Georgia, 4 pages.
Vuorilehto, "Size Control of Lumber by Optical Means," Inx-Systems, Inc., Cumming, Georgia, 6 pages.
Barker, "Sawmill Log Speed Adjustment Using Saw Deflection Information," Office Action mailed Mar. 15, 2007 for U.S. Appl. No. 10/942,575, 5 pages.
Barker, "Sawmill Log Speed Adjustment Using Saw Deflection Information," Amendment filed Sep. 4, 2007 for U.S. Appl. No. 10/942,575, 6 pages.
Barker, "Sawmill Log Speed Adjustment Using Saw Deflection Information," Office Action mailed Nov. 2, 2007 for U.S. Appl. No. 10/942,575, 13 pages.
Barker, "Sawmill Log Speed Adjustment Using Saw Deflection Information," Amendment filed May 2, 2008 for U.S. Appl. No. 10/942,575, 6 pages.
Barker, "Sawmill Log Speed Adjustment Using Saw Deflection Information," Office Action mailed Jun. 23, 2008 for U.S. Appl. No. 10/942,575, 12 pages.
Barker, "Systems and Methods for Monitoring a Saw Blade During Sawing," Office Action mailed Jan. 27, 2010 for U.S. Appl. No. 11/873,101, 10 pages.
Barker, "Systems and Methods for Monitoring a Saw Blade During Sawing," Amendment filed Apr. 22, 2010 for U.S. Appl. No. 11/873,101, 20 pages.
Barker, "Systems and Methods for Monitoring a Saw Blade During Sawing," Office Action mailed May 10, 2010 for U.S. Appl. No. 11/873,101, 10 pages.
Barker, "Systems and Methods for Monitoring a Saw Blade During Sawing," Amendment filed Jul. 23, 2010 for U.S. Appl. No. 11/873,101, 13 pages.
Barker, "Systems and Methods for Monitoring a Saw Blade During Sawing," Office Action mailed Jun. 8, 2010 for U.S. Appl. No. 11/873,101, 11 pages.
Barker, "Systems and Methods for Monitoring a Saw Blade During Sawing," Amendment filed Aug. 5, 2010 for U.S. Appl. No. 11/873,101, 26 pages.
Barker, "Systems and Methods for Tracking Lumber in a Sawmill," Office Action mailed Aug. 4, 2010 for U.S. Appl. No. 11/873,090, 9 pages.
Barker, "Systems and Methods for Tracking Lumber in a Sawmill," Amendment filed Jan. 4, 2011 for U.S. Appl. No. 11/873,090, 12 pages.
Barker, "Systems and Methods for Tracking Lumber in a Sawmill," Office Action mailed Mar. 23, 2011 for U.S. Appl. No. 11/873,090, 8 pages.
Barker, "Systems and Methods for Tracking Lumber in a Sawmill," Amendment filed May 23, 2011 for U.S. Appl. No. 11/873,090, 12 pages.
Barker, "Systems and Methods for Tracking Lumber in a Sawmill," Office Action mailed Nov. 7, 2011 for U.S. Appl. No. 12/424,402, 9 pages.
Barker, "Systems and Methods for Tracking Lumber in a Sawmill," Amendment filed Feb. 3, 2012 for U.S. Appl. No. 12/424,402, 15 pages.
Barker, "Systems and Methods for Tracking Lumber in a Sawmill," U.S. Appl. No. 13/529,549, filed Jun. 29, 2012, 66 pages.

* cited by examiner

SYSTEMS AND METHODS FOR AUDITING OPTIMIZERS TRACKING LUMBER IN A SAWMILL

BACKGROUND

Technical Field

This description generally relates to sawmills, and more particularly to optimizers which optimize operation of equipment in sawmills.

Description of the Related Art

The sawmill industry has become largely automated. Full length tree trunks are delivered to sawmills, where they are automatically debarked, scanned and bucked (i.e., cut into log segments) based on their scanned geometry. These log segments are then typically processed at a number of automated stations, depending on the sawmill and the type of wood. These processing stations produce lumber from each log segment, often without any human intervention.

One of the first processing stations in many sawmills is the primary breakdown machine, which processes log segments to produce cants and sideboards. The primary breakdown machine typically includes chip heads for removing slabs as well as one or more band saws for removing sideboards from the log segments, leaving the middle portion of the log which has two flat surfaces and is called a cant. The width of the cant is the width of the lumber that will be sawn from the cant, typically using a gangsaw. A primary breakdown optimizer system may scan each log segment prior to processing at the primary breakdown machine. A primary breakdown optimizer computer of the primary breakdown optimizer system then determines an optimal mix of lumber that can be obtained from that log segment based on the scanned geometry. The optimizer computer may then cause rotation of the log segment and control the relative position of the chip heads and band saws to achieve that optimal mix of lumber.

Downstream from the primary breakdown machine, cants may be further processed at a gangsaw to produce boards. Gangsaws typically include a number of parallel, circular saw blades located at precise intervals within a sawbox and, at the front of the sawbox, two chip heads (e.g., vertical drum chip heads) for removing excess wood from the outside of each cant. Cants may be transported in a straight line through the gangsaw using feed rolls on the upstream and downstream sides of the sawbox. Alternatively, cants may be driven through the gangsaw along a curved path as part of a curve sawing process. Alternatively, the sawbox may be moved during the cut to produce a curved sawing path. In many sawmills, a gangsaw optimizer system employs a cant scanner to scan the incoming cants prior to processing by the gangsaw. A gangsaw optimizer computer of the gangsaw optimizer system then determines optimal locations for the chip heads and saw blades based on the scanned geometry of each cant, including any curved paths for sawing.

Boards sawn by the gangsaw, as well as sideboards from the primary breakdown machine, may then be processed by an edger. The edger typically includes one or more saw blades for sawing along the length of the boards to achieve a chosen width. After edging, the boards are transported to a trimmer, where the boards can be trimmed to a final length. Both the edger and the trimmer may also have corresponding optimization systems including respective scanning systems and optimizer computers to determine how best to saw each piece of lumber.

At each processing station, an optimizer system makes determinations regarding the optimal way to saw each piece to maximize the value and volume of lumber produced from the raw logs. These optimizer systems are very complicated and expensive, and are also difficult to manage properly because of their complexity. If some portion of an optimizer system is not performing as expected, the sawmill can easily suffer a 1% to 4% loss of value until the problem is found and fixed. Thus, significant sums of money may be lost should any one optimizer system not function correctly.

Typically, a cant optimizer has a user interface that displays graphical representations of the cant along with pictures of the boards that will be cut from the particular cant. The sawmill can hypothetically manually review their processes by looking at the computed solutions as presented via the user interface, and manually comparing the actual lumber produced to the lumber that has been predicted by the optimization system. This process is difficult in practice due in part to the large volume of information. This process is also difficult in practice because the outside boards with wane on them generally fall wane side down on the outfeed conveyor, making it hard to judge the width and length of the boards without pulling the boards off of the conveyor downstream. Thus, to the extent that sawmills wish to review their processes, as a practical matter such would have to occur during periods when the sawmill is not running full production, testing individual cants one at a time and collecting the data by hand. This sampling is not only laborious, but does not provide a complete picture of the processes. Further, since the sampling would typically need to occur when the sawmill is not operating at capacity, the results of the sampling would be inherently suspect. This approach certainly cannot provide real time information, nor can this approach provide the ability to assess trends over time.

Thus, modern sawmills lack an effective way to determine if the processing stations are indeed functioning correctly and realizing optimal value from the raw resources. Consequently, there is a need for improvement.

BRIEF SUMMARY

Described herein are apparatus and methods to audit a sawmill optimization system, for example a cant optimizer system. The audit systems and methods may be completely independent of the optimizer, the operation of which is the subject of the auditing. The described optimizer auditing may advantageously allow a sawmill to tune the optimizer for maximum recovery. The described optimizer auditing may analyze every solution identified by an optimizer. The described optimizer auditing may operate in real time or almost real time, detecting problems and issuing timely alarms when the optimizer performance is below a desired level of performance (e.g., normal). The described optimizer auditing may assess trends over significant amounts of time, for example hours, days, weeks, months or years. Thus, rather than taking what is at best a random sample, the optimizer audit system may continuously or periodically sample all or a large portion of the determined solution for each respective log or cant that is processed.

The audit systems and methods described herein may advantageously audit and monitor optimizers, for example cant optimizers, without any knowledge of what the optimizer is attempting to accomplish or operating. Thus, audit systems and methods described herein can recognize divergence from an optimal sawing solution, and issue notifications or alarms for a large number of problems that might occur in the lumber processing.

Further, audit systems and methods described herein may be easier to install and less expensive than a system which relies on a feed of optimizer data from an optimizer system which is the subject auditing.

A method of automated auditing of sawmill operation may be summarized as including acquiring via at least one sensor a set of geometrical information from a number of pieces of lumber following at least partial completion of a sawing operation; computationally determining by at least one processor at least one geometric characteristic of a log from which the pieces of lumber were sawn based at least in part on the acquired set of geometrical information; computationally simulating by at least one processor a plurality of simulated sawing solutions, each of at least some of the simulated sawing solutions different from an actual sawing solution used in the sawing operation; and computationally determining by at least one processor a simulated amount of recovery from the log for each of at least some of the simulated sawing solutions.

The method may further include for each of at least some of the simulated sawing solutions, computationally comparing a respective one of the determined simulated amount of recovery from the log to an actual amount of recovery from the log, the actual amount of recovery corresponding to at least one of a volume or a value of lumber produced from the log by the actual sawing solution used in the sawing operation and the determined simulated amount of recovery from the log corresponding to at least one of a volume or a value of lumber that would have been produced from the log by use of the respective simulated sawing solution. The method may further include providing an indication of a variation between the determined simulated amount of recovery from the log and the actual amount of recovery from the log. The method may further include providing a notification if a variation between the determined simulated amount of recovery from the log and the actual amount of recovery from the log exceeds a defined threshold. The method may further include stopping operation of a piece of sawing equipment if a variation between the determined simulated amount of recovery from the log and the actual amount of recovery from the log exceeds a defined threshold. The method may further include adjusting operation of at least one of a piece of sawing equipment or an optimizer system that is controlling coupled to optimize operation of the at least one piece of sawing equipment based at least in part on a comparison between the determined simulated amount of recovery from the log and the actual amount of recovery from the log. Acquiring via at least one sensor a set of geometrical information from a number of pieces of lumber following at least partial completion of a sawing operation may include optically acquiring geometrical information from a plurality of boards downstream of a gangsaw. Computationally determining by at least one processor at least one geometric characteristic of a log from which the pieces of lumber were sawn based at least in part on the acquired set of geometrical information may include computationally fitting a curve to a contour of wane on an outermost one of the boards. The curve may be a basis spline and may computationally determine by at least one processor at least one geometric characteristic of a log from which the pieces of lumber were sawn based at least in part on the acquired set of geometrical information may further include computationally constructing a simulated cant from image data representing the boards before fitting the basis spline to the contour of wane on the outermost one of the boards. Computationally simulating by at least one processor a plurality of sawing solutions may include simulating respective sawing solutions at each of a number of increments spaced perpendicularly in two directions from a sawn face of at least one of the boards in the simulated cant. Computationally simulating by at least one processor a plurality of sawing solutions may include simulating a plurality of sawing solutions in which at least one saw path is spaced perpendicularly from a sawn face of at least one of the boards in at least one direction by a defined distance. Computationally simulating by at least one processor a plurality of sawing solutions may further include computationally simulating at least one edging or trimming operation. Computationally simulating at least one edging or trimming operation may include computationally simulating at least one edging or trimming operation based at least in part on a number of wane rules. Computationally determining by at least one processor a simulated amount of recovery from the log for each of at least some of the simulated sawing solutions may include taking into account a price of lumber. Computationally determining by at least one processor a simulated amount of recovery from the log for each of at least some of the simulated sawing solutions may include taking into account a number of wane rules.

An optimizer audit system to audit operation of an optimizer in sawmill operation may be summarized as including at least one non-transitory processor-readable medium that store processor executable instructions; at least one processor that computationally determines at least one geometric characteristic of a log from which the pieces of lumber were sawn based at least in part on an acquired set of geometrical information, computationally simulates a plurality of simulated sawing solutions, each of at least some of the simulated sawing solutions different from an actual sawing solution used in the sawing operation; and computationally determines a simulated amount of recovery from the log for each of at least some of the simulated sawing solutions.

The at least one processor may further computationally compare a respective one of the determined simulated amount of recovery from the log for each of at least some of the simulated sawing solutions to an actual amount of recovery from the log, the actual amount of recovery corresponding to at least one of a volume or a value of lumber produced from the log by the actual sawing solution used in the sawing operation and the determined simulated amount of recovery from the log corresponding to at least one of a volume or a value of lumber that would have been produced from the log by use of the respective simulated sawing solution. The at least one processor may further provide an indication of a variation between the determined simulated amount of recovery from the log and the actual amount of recovery from the log. The at least one processor may further cause a notification to be provided if a variation between the determined simulated amount of recovery from the log and the actual amount of recovery from the log exceeds a defined threshold. The at least one processor may further cause operation of a piece of sawing equipment to stop if a variation between the determined simulated amount of recovery from the log and the actual amount of recovery from the log exceeds a defined threshold. The at least one processor may further cause adjustment of an operation of at least one of a piece of sawing equipment or an optimizer system that is controlling coupled to optimize operation of the at least one piece of sawing equipment based at least in part on a comparison between the determined simulated amount of recovery from the log and the actual amount of recovery from the log. The optimizer audit system may further include a number of laser scanners positioned to optically acquire the acquired geometrical information from a plurality of boards downstream of a gangsaw. The at least one processor may computationally fit a curve to a contour of wane on an outermost one of the boards in order to computationally determine the at least one geometric characteristic of the log from which the pieces of lumber were sawn based at least in part on the acquired set of geometrical information. The curve may be a basis spline and the at least one processor may computationally construct a simulated cant from image data representing the boards before fitting the basis spline to the contour of wane on the outermost one of the boards. Computationally simulating by at least one processor a plurality of sawing solutions may include the at least one processor simulates respective sawing solutions at each of a number of increments spaced perpendicularly in two directions from a sawn face of at least one of the boards in the simulated cant. The at least one processor may computationally simulate a plurality of sawing solutions in which at least one saw path is spaced perpendicularly from a sawn face of at least one of the boards in at least one direction by a defined distance. The at least one processor may further computationally simulate at least one edging or trimming operation. The at least one processor may computationally simulate the at least one edging or trimming operation based at least in part on a number of wane rules. The at least one processor may take into account a price of lumber to computationally determine the simulated amount of recovery from the log for each of at least some of the simulated sawing solutions. The at least one processor takes into account a number of wane rules to computationally determine the simulated amount of recovery from the log for each of at least some of the simulated sawing solutions.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sawmills, bucking and merchandizing processes, primary breakdown machines, gangsaws, edgers, trimmers, saws, computing devices, imaging systems and/or laser scanners have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

As used herein, lumber is a broad term, referring to any piece of wood, including, for example, uncut, undebarked logs, partially processed logs, log segments, cants, sideboards, flitches, edging strips, boards, finished lumber, etc. The term, log, unless apparent from its context, is also used in a broad sense and may refer to, inter alia, uncut, undebarked logs, partially processed logs or log segments.

The headings and Abstract of the Disclosure provided herein are for convenience only and do not interpret the scope or meaning of the embodiments.

Description of an Example System for Tracking Lumber in a Sawmill

Figure 1:
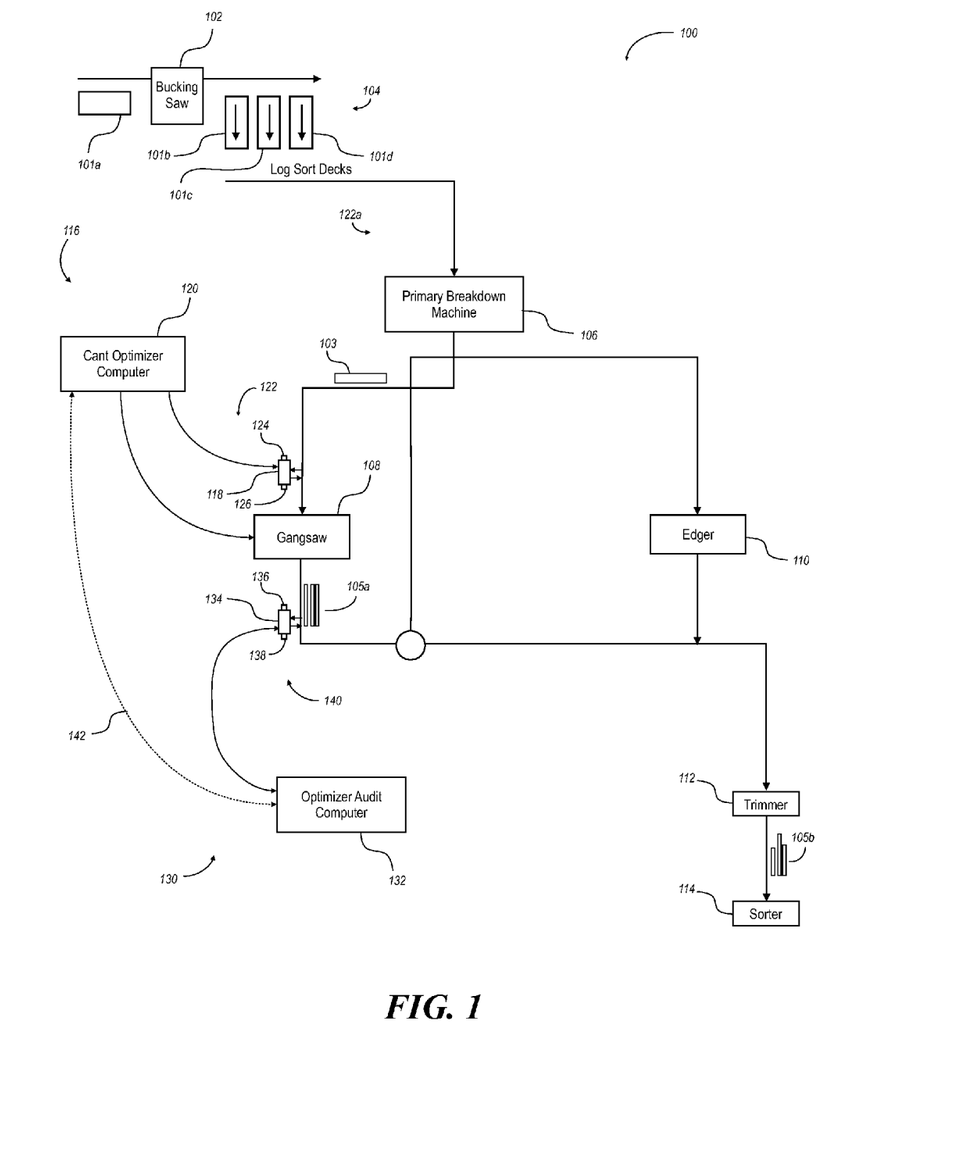
FIG. 1 is a schematic view of an example sawmill having at least one optimizer system and at least one optimizer auditing system, according to one illustrated embodiment.

FIG. 1 is a schematic view of an examplary a lumber mill or sawmill 100 incorporating a system 102 that audits at least one optimizer, according to one illustrated embodiment.

The below overview of the sawmill 100 provides background to describe various embodiments of the new systems and methods described herein. Such is not intended to be in any way limiting, and the new systems and methods described herein may be practiced in other configurations of sawmills.

The sawmill 100 includes a variety of machines to process logs 101a-101d (four illustrated, collectively 101) into cants 103 (only one illustrated), and cants 103 into sawn lumber 105a, 105b (collectively 105). The machines are described below generally in terms of the flow of raw logs 101a through the sawmill to produce sawn lumber 105b as the final product. The flow is generally indicated by wide arrows. In contrast, communication paths are generally indicated by thin arrows. It is recognized that other sawmills may include additional machines, may omit one or more of the illustrated machines, and/or may process logs 101 into sawn lumber in a different manner.

The sawmill 100 may, for example, include one or more bucking saws 102 operated to buck logs 101a into sections of desired lengths. The sawmill 100 may include one or more log sort decks 104 where bucked logs 101b-101d are sorted, for example by species, size and intended end use.

The sawmill 100 may include one or more primary breakdown machines 106, sometimes referred to as a canter. The primary breakdown machine(s) 106 may include one or more chip heads or chippers 106a which generally remove bark from a bucked log section. The primary breakdown machine(s) 106 may additionally include one or more head or other saws 106b which cuts the chipped and bucked log sections to produce cants 103 and flitches (not shown in FIG. 1).

The sawmill 100 may include one or more gangsaws 108. The gangsaw(s) 108 may include one or more gangs or arbors of circular blades that cut a cant 103 into individual boards 105a of sawn lumber. The gangsaw 108 may, for example take the form of a double arbor gangsaw which includes a lower arbor that saws into a cant 103 from the bottom and an upper arbor which saws into the cant 103 from the top. A double arbor gangsaw can accommodate cants 103 of a larger variety of widths than might otherwise be possible with a single arbor gangsaw. The gangsaw 108 may take the form of a curve sawing gangsaw, which saws a curved path through the cant 103 in an effort to maximize the value of sawn lumber produced from each cant 103. The curved path is customized to or defined specifically for each cant 103.

The sawmill 100 may include one or more edgers 110 which edge irregular edges to produce sawn lumber 105 with two pairs of essentially parallel sides. The edger(s) 110 may reduce a width of the board to remove imperfections that would otherwise reduce the value of the resulting board of sawn lumber. The sawmill 100 may include one or more trimmers 112 which cut the sawn lumber 105 to length. The trimmer(s) 112 reduces the length of a board 105b to remove imperfections that would otherwise reduce the value of the resulting sawn lumber 105. The edger(s) 110 and trimmer(s) 112 are operated based on a variety of rules related to grading, for example rules that set out acceptable amounts of imperfection.

The sawmill 100 may include one or more sorters 114 to sort the sawn lumber 105b. In some instances, the sorter is an automated system, while in other instances sorting may be done manually at the sorter station. Sawn lumber 105b may be dried either using a kiln (not shown) or air-dried.

Automation of sawmills 100 is becoming increasingly more common. Automation not only reduces headcount and associated costs, but also allows higher value to be extracted from the raw materials or logs 101. For example, automation allows reduction in waste, for instance by reducing the amount of excess on each board 105a produced by a gangsaw 108, which excess would otherwise be edged or trimmed to achieve nominal size. Also for example, automation allows production of boards of sawn lumber 105 with higher value than might otherwise be produced from a given log 101 or cant 103. For instance, there is a large number of ways of sawing any given log 101 or cant 103. Some ways of breaking up a log 101 or cant 103 into boards of sawn lumber 105 result in the boards having higher cumulative value than other ways. Such may be affected based on sizes and imperfections, as well as on the then current prices for boards.

As part of automating the sawmill, one or more optimizer systems 116, commonly referred to as optimizers, may be installed. The optimizer(s) 116 analyze information about the input (e.g., log 101a, log section 101b-101d) of a set of operations (e.g., gangsawing), and automatically determine a number of parameters intended to optimize the operations, for example to produce an optimized output (e.g., collection of sawn boards 105 with a highest cumulative value possible for a given log 101 or cant 103).

The optimizers 116 typically include one or more acquisition devices 118 (only one shown) to acquire information from the logs 101, cants 103 or boards 105, and one or more computers 120 (only one shown) programmed to process and/or analyze the acquired information and produce an optimized solution that is intended to optimize an output of the operation(s). In the interest of brevity, only a single cant optimizer 116, used to control operation of the gangsaw 108, is described herein. The sawmill 100 may include other optimizers (not shown) in conjunction with one or more other pieces of equipment (e.g., primary breakdown machine 106, edger 110, trimmer 112). The other optimizer(s) may be in addition to the cant optimizer 116. Alternatively, the sawmill 100 may omit the cant optimizer 116, and may employ one or more other optimizer(s) (not shown) associated with various pieces of equipment.

For each piece of equipment to be monitored or optimized, one or more respective scan zones may be set up. For example, the sawmill 100 may include a plurality of cant scan zones 122, for instance a bucking scan zone (not shown), a log segment sorting scan zone (not shown), a pre-primary breakdown scan zone (not shown), a post-primary breakdown or pre-gangsaw scan zone 122 (referred to herein as cant scan zone 122), a post-gangsaw scan zone (not shown), an edger scan zone (not shown), and/or a trimmer scan zone (not shown). As noted above, in the interest of brevity only optimization with respect to the gangsaw 108 is discussed, thus only the cant scan zone 122 is called out in FIG. 1. It is recognized that the sawmill 100 may include more or fewer cant scan zones 122, and the scan zones may be in different locations and differently configured. It is additionally recognized that the auditing of optimizers discussed herein may occur for a single optimizer or for two or more optimizers. It is further recognized that auditing may be performed independently for each optimizer, or an integrated approach may perform auditing across two or more optimizers.

The cant scan zone 122 is set up or configured to allow capture of information representing the geometry of the cant 103, thus it follows the primary breakdown machine 106 and precedes the gangsaw 108. A typical cant optimizer system 116 scans the cant 103 geometry using acquisition devices 118 (e.g., three-dimensional laser equipment). Generally the cant 103 is moved either transversely or longitudinally through the scanning system to obtain precise shape information. Based at least in part on the scanned geometry of the cant 103, the cant optimizer computer 120 simulates thousands of different ways to cut the cant 103 into lumber, and picks a solution intended to maximize a value or volume of lumber 105 produced from the cant 103. Inputs to this process include board size requirements, wane rules and lumber prices. The software must simulate the behavior of three different machines: the gangsaw 108, the edger 110 and the trimmer 112. The cant optimizer system 116 causes the positioning of the cant 103 onto a conveyor that moves the cant 103 towards the gangsaw 108 while maintaining a known position. The cant optimizer system 116 controls the chip heads and saws in the gangsaw 108 that will implement the optimized solution found by the cant optimizer system 116.

The acquisition devices 118 may take a variety of forms capable of sensing, capturing or otherwise acquiring information or data about the logs 101, cants 103 and/or boards 105. The acquisition devices 118 are often visual or optical acquisition devices that optically sense, capture or otherwise acquire information or data about one or more dimensions of the logs, cants and/or boards. The acquisition devices 118 may include one or more cameras or other optical sensors 124, for example an analog or digital video camera or digital still camera. Where an analog video camera is used, the acquisition devices 118 may include a frame grabber (not shown) to grab frames of the analog video and produce digital images (e.g., digital image data) suitable for processing. The acquisition devices 118 may include one or more light sources 126, for example flood illumination sources (e.g., incandescent or gas discharge lamps or lights) or coherent sources (e.g., lasers, one-or two-dimensional laser scanners). Many commercially available laser scanners may be suitable, for example those sold by JoeScan Inc. Alternatively, other types of acquisition devices may be employed, for instance contact sensors that physically contact the log, cant or board, to sense or acquire dimensions, or acoustic sensors that acoustically sense or acquire the dimensions.

The cant optimizer 116 is typically communicatively coupled to control operation of one or more of the machines in the sawmill 100, for example via a control line 129. The cant optimizer 116 may, for example, control operation of the gangsaw 108 in an attempt to optimize operation or output thereof, for instance to produce boards of the highest value possible from a given log or cant. The cant optimizer 116 may provide information regarding optimization to an end user, for example via a user interface (e.g., display or monitor) and/or reports either printed by a printer or displayed via a display or monitor.

The sawmill 100 may advantageously include an optimizer auditing system 130, which includes at least one optimizer auditing computer 132 and one or more acquisition devices 134. Similarly to the acquisition device(s) 118, the acquisition device(s) 134 may include one or more cameras or other optical sensors 136 and optionally one or more light sources 138. The acquisition device(s) 134 may be set up to form one or more optimizer auditing system scan zones 140. While the acquisition device(s) 134 are illustrated in FIG. 1 as separate from the acquisition device(s) 118, some installations may employ the same acquisition devices to acquire data or information for both an optimizer 116 and an optimizer auditing system 130. Such may, however, reduce the ability of detecting problems related to the acquisition devices.

As described herein, the optimizer auditing system 130 may audit the operation or performance of one or more optimizers, for example the cant optimizer system 116. The optimizer auditing system 130 may determine whether the boards 105 actually coming from the gangsaw 108 (FIG. 1) are optimized, for example of a highest value or volume possible given certain defined criteria (e.g., current lumber prices, cant geometry). Where optimizer auditing system 130 employs identical or even similar criteria as the cant optimizer system 116, the optimizer auditing system 130 can identify at least the existence of errors or aberrations in the operation or performance of the cant optimizer system or a component (e.g., acquisition devices 118, FIG. 1) thereof. The optimizer auditing system 130 may advantageously audit the operation or performance of the cant optimizer system 116 completely independently of the cant optimizer system 116. For example, the optimizer auditing system 130 may rely only on board geometry information captured via the acquisition devices 134 of the optimizer auditing system 130, without any communications with the cant optimizer system 116 which is the subject of the auditing. Alternatively, the optimizer auditing system 130 may be communicatively coupled to the cant optimizer system 116 or a component thereof by one or more optional communications channels 142 (shown in broken line to indicate that such is optional). Communications may allow the optimizer auditing system 130 to employ digital information used by the cant optimizer system 116 in performing optimization. For instance, such information may include cant geometry information, wane rules, current lumber pricing information, and/or selected "best" solutions computationally determined by the optimizer system computer 120.

Figure 2:
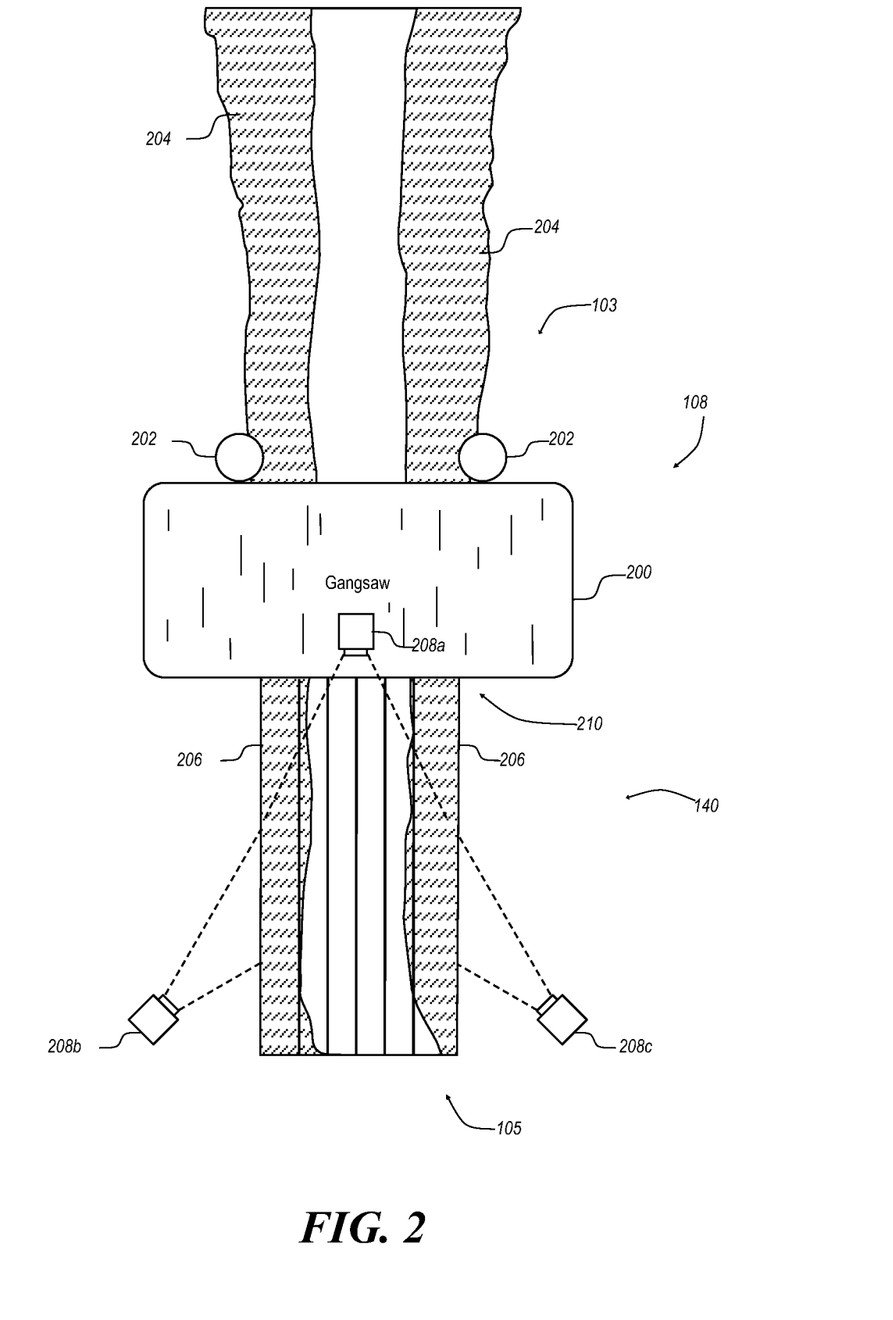
FIG. 2 is a top plan view of a gangsaw scan zone including a number of scanners of the optimizer auditing system of FIG. 1, positioned and oriented to scan boards sawn from a cant, according to one illustrated embodiment.
Figure 3:
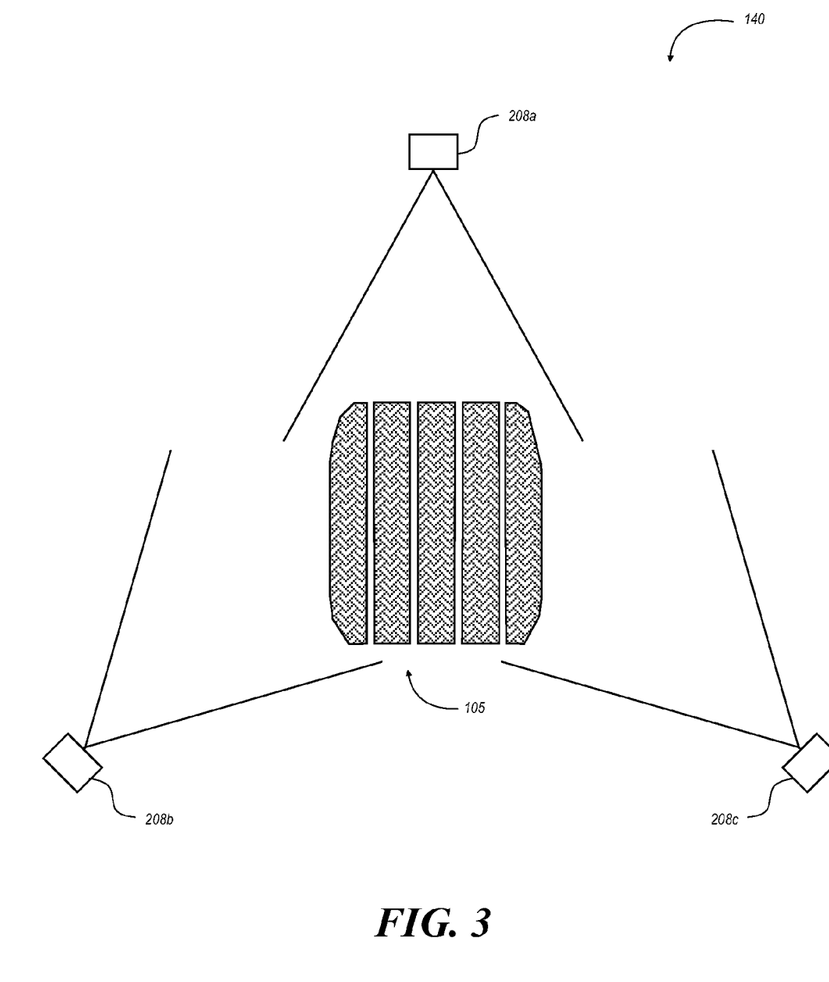
FIG. 3 is a front elevational view of the gangsaw scan zone including the scanners of the optimizer auditing system of FIG. 2.

FIGS. 2 and 3 show the optimizer auditing system scan zone 140 and boards 105, with an arriving cant 103 and the gangsaw 108 (illustrated only in FIG. 2 for clarity of illustration), according to one illustrated embodiment.

The gangsaw 108 may have any of a number of configurations. For example, the gangsaw 108 may be either a single arbor or a double arbor gangsaw having a number of parallel, circular saw blades located at precise intervals within a sawbox 200. The gangsaw 108 may also include more saw blades than are used to saw each arriving cant 103, and the gangsaw 108 may be controlled to distribute the sawing workload among the saw blades to ensure that certain saw blades are not over-utilized while others are under-utilized. At the front of the sawbox 200, the gangsaw 108 may further include chip heads 202, such as vertical drum chip heads, that remove excess wood 204 (FIG. 2) from an outside of each cant 103.

Although not illustrated in FIGS. 2 and 3, the cants 103 may be scanned by the acquisition devices 118 of the cant optimizer 116 either transversely or lineally before the cants 103 arrive at the gangsaw 108. This scanning may be used to derive information regarding the geometry of the cants 103, and the cant optimizer computer 120 may use this information to determine an optimal way to saw each cant 103 into a plurality of boards 105. Based on the determined optimal sawing process, the gangsaw optimizer computer 120 may send appropriate commands to a PLC that then directly controls the gangsaw 108 during sawing.

Prior to the cant 103 being completely sawn by the gangsaw 108, the boards 105 may emerge from the gangsaw 108 in an ordered arrangement, substantially parallel to one another, for instance as illustrated in FIGS. 2 and 3. The boards 105, and particularly the outermost ones of the boards 105, may include wane 206 on the edges or outer perimeters thereof. After the cant 103 has been completely sawn by the gangsaw 108, the boards 105 may emerge from the gangsaw 108, fall apart, and are transported for some distance lineally along a rollcase or belt conveyor. The rollcase may include keystock welded to the rolls in order to bounce the boards 105 up and down in order to remove most of the sawdust. This bouncing may also tend to flatten the boards 105 out as the boards 105 separate. When the boards 105 emerge from the gangsaw 108, they may be arranged near each other and in the same order in which they were sawn by the gangsaw 108 (i.e., the third board from the left on the rollcase was also the third board from the left during the sawing process).

As acquisition devices 134, the optimizer auditing system scan zone 140 may include three planar laser scanners 208a-208c (collectively 208) positioned at an outfeed 210 of the gangsaw 108 in order to scan boards 105 in a partially sawn configuration. Alternatively, a four scanner configuration (not shown) may be used, such that bottom laser scanners scan the bottom edges of the boards 105, while top laser scanners scan the top edges of the boards 105. As another alternative, a single planar laser scanner configuration (not shown) may be employed. The laser scanners 208 may include one or more laser sources that produce one or more lasers beams of light, an oscillation mechanism (e.g., rotating or oscillating mirror or reflector, for instance a rotating polygonal mirror) that oscillates the laser beam(s) of light, and an optical sensor to detect light returned from the boards 105 illuminated by the laser beam(s) of light. Many commercially available laser scanners may be suitable, for example those sold by JoeScan Inc.

Figure 4:
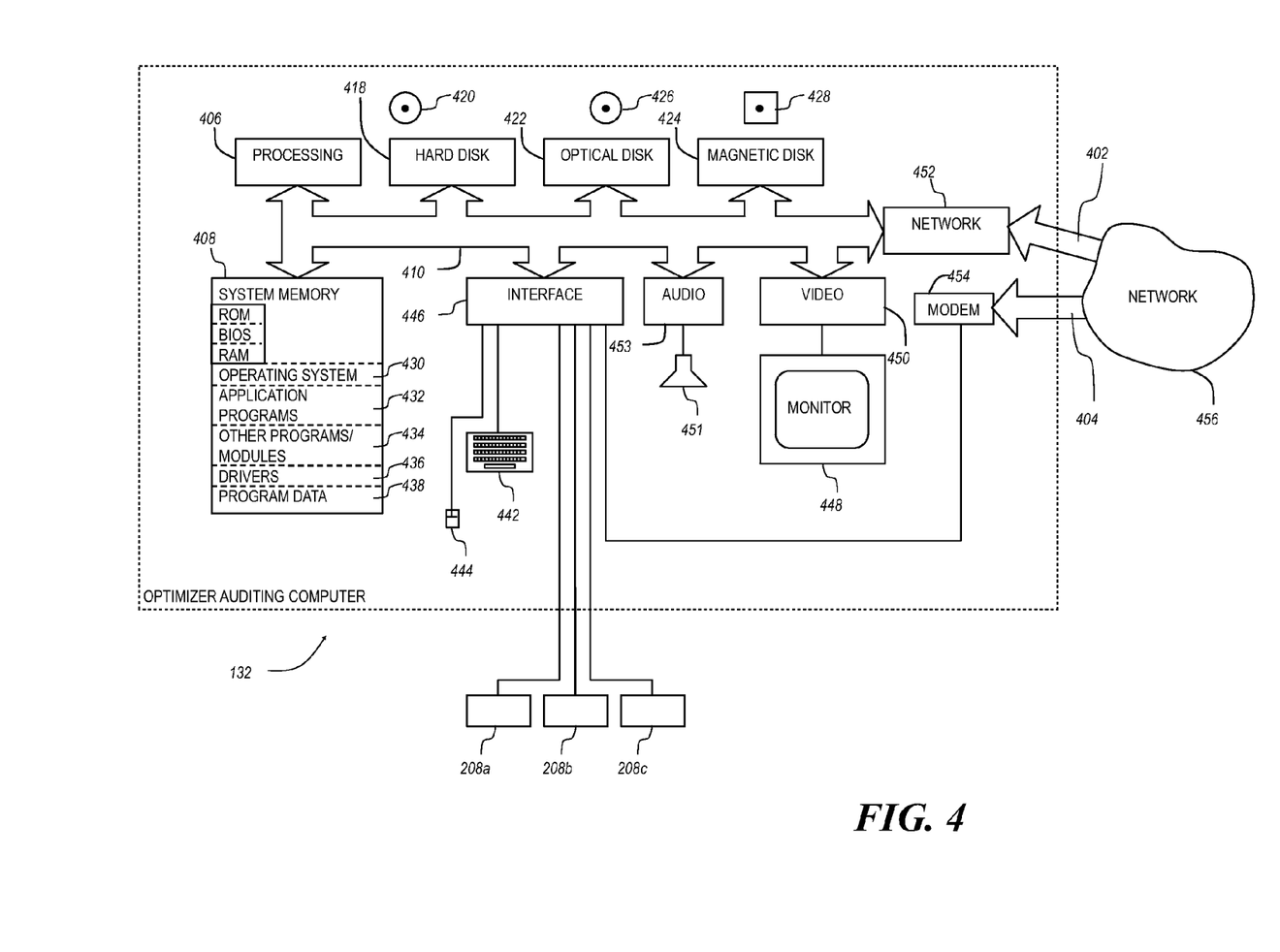
FIG. 4 is a schematic diagram of an optimizer audit computer of the optimizer auditing system of FIG. 1, according to one illustrated embodiment.

FIG. 4 is a schematic diagram of an optimizer auditing computer 132 that may be used to audit operation or performance of an optimizer, for instance a cant optimizer system 116, according to one illustrated embodiment.

Although not required, the embodiments will be described in the general context of computer-executable instructions, such as program application modules, objects, or macros being executed by a computer. Those skilled in the relevant art will appreciate that the illustrated embodiments as well as other embodiments can be practiced with other computer system configurations, including handheld devices, multi-processor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 4 shows the optimizer auditing computer 132 coupled by one or more communications channels/logical connections 402, 404 to a network 456. However, in other embodiments, the optimizer auditing computer 132 need not be coupled to a network. The communications channels/logical connections 402, 404 may allow the optimizer auditing computer 132 to receive information useful in auditing operation or performance of an optimizer system. For example, optimizer auditing computer 132 may receive updated lumber pricing information and/or rule changes such as new wane rules.

The optimizer auditing computer 132 may take the form of a conventional PC, which includes a processing unit 406, a system memory 408 and a system bus 410 that couples various system components including the system memory 408 to the processing unit 406. The optimizer auditing computer 132 will at times be referred to in the singular herein, but this is not intended to limit the embodiments to a single computing system, since in certain embodiments, there will be more than one computer system involved. Non-limiting examples of commercially available optimizer auditing computers include, but are not limited to, an 80x86 or Pentium series microprocessor from Intel Corporation, U.S.A., a PowerPC micro processor from IBM, a Sparc microprocessor from Sun Microsystems, Inc., a PA-RISC series microprocessor from Hewlett-Packard Company, or a 68xxx series microprocessor from Motorola Corporation.

The processing unit 406 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 4 are of conventional design. As a result, such blocks need not be described in further detail herein, as they will be understood by those skilled in the relevant art.

The system bus 410 can employ any known bus structures or architectures, including a memory bus with memory controller, a peripheral bus, and a local bus. The system memory 408 includes read-only memory ("ROM") 412 and random access memory ("RAM") 414. A basic input/output system ("BIOS") 416, which can form part of the ROM 412, contains basic routines that help transfer information between elements within the optimizer auditing computer 132, such as during start-up.

The optimizer auditing computer 132 also includes a hard disk drive 418 for reading from and writing to a hard disk 420, and an optical disk drive 422 and a magnetic disk drive 424 for reading from and writing to removable optical disks 426 and magnetic disks 428, respectively. The optical disk 426 can be a CD or a DVD, while the magnetic disk 428 can be a magnetic floppy disk or diskette. The hard disk drive 418, optical disk drive 422 and magnetic disk drive 424 communicate with the processing unit 406 via the system bus 410. The hard disk drive 418, optical disk drive 422 and magnetic disk drive 424 may include interfaces or controllers (not shown) coupled between such drives and the system bus 410, as is known by those skilled in the relevant art. The drives 418, 422, 424, and their associated computer-readable media 420, 426, 428, provide nonvolatile storage of computer-readable instructions, data structures, program modules and other data for the optimizer auditing computer 132. Although the depicted optimizer auditing computer 132 employs hard disk 420, optical disk 426 and magnetic disk 428, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in the system memory 408, such as an operating system 430, one or more application programs 432, other programs or modules 434, drivers 436 and program data 438. While shown in FIG. 4 as being stored in the system memory 408, the operating system 430, application programs 432, other programs/modules 434, drivers 436 and program data 438 can be stored on the hard disk 420 of the hard disk drive 418, the optical disk 426 of the optical disk drive 422 and/or the magnetic disk 428 of the magnetic disk drive 424. A user can enter commands and information into the optimizer auditing computer 132 through input devices such as a touch screen or keyboard 442 and/or a pointing device such as a mouse 444. Other input devices can include a microphone, joystick, game pad, tablet, scanner, etc. These and other input devices are connected to the processing unit 406 through an interface 446 such as a universal serial bus ("USB") interface that couples to the system bus 410, although other interfaces such as a parallel port, a game port or a wireless interface or a serial port may be used. A monitor 448 or other display device is coupled to the system bus 410 via a video interface 450, such as a video adapter. A speaker 451 is coupled to the system bus 410 via an audio interface 453. The monitor 448 and/or speaker 451 may be operated to respectively provide visual and aural alerts, for example in response to detecting an error, aberration or out of performance condition of the audited optimizer system. Although not shown, the optimizer auditing computer 132 can include other output devices, such as printers, etc.

The optimizer auditing computer 132 may operate in a networked environment using one or both of the logical connections 402, 404 to communicate with one or more remote computers, servers and/or devices through the network 456. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the optimizer auditing computer 132 may include a modem 454 for establishing communications over the WAN 404. Alternatively, another device, such as the network interface 452 (communicatively linked to the system bus 410), may be used for establishing communications over the WAN 402. The modem 454 is shown in FIG. 4 as communicatively linked between the interface 446 and the WAN 404. In a networked environment, program modules, application programs, or data, or portions thereof, can be stored in a server computing system (not shown). Those skilled in the relevant art will recognize that the network connections shown in FIG. 4 are only some examples of ways of establishing communications between computers, and other connections may be used, including wirelessly.

As illustrated in FIG. 4, the optimizer auditing computer 132 is further coupled to the acquisition devices 134 of the optimizer auditing system scan zone 140, for example planar laser scanners 208a, 208b, 208c. The planar laser scanners 208a, 208b, 208c may be communicatively coupled to the system bus 410 through the interface 446 and are thereby communicatively coupled to the optimizer auditing computer 132. The optimizer auditing computer 132 may further include optimizer application programs 432 for receiving data from the planar laser scanners 208a, 208b, 208c, processing that data, and determining optimal solutions (e.g., dimensions of boards 105 which may be sawn from a given cant 103). As previously noted, the optimizer auditing computer 132 may receive up-to-date market information for lumber and/or rules (e.g., wane rules) via the network 456.

Operation of the optimizer auditing system will be discussed with reference to FIGS. 5-9. In particular, operation is discussed with respect to a method 500 illustrated in FIG. 5, and with an example of boards illustrated in FIGS. 6 and 7, an example of calculating log geometry illustrated in FIG. 8 and an example of performance variation illustrated in FIG. 9.

In auditing an optimizer system, for example the cant optimizer system 116 (FIG. 1), the question is: how can one tell whether the optimizer is doing a good job with no knowledge of the optimizer computed solutions.

Trees have a tapered shape by nature, and therefore cants 103 (FIG. 1) also tend to have a tapered shape. Consequently, an optimal sawing solution for a cant 103 often has a full length board 105 (FIGS. 1-3) on one outermost side and a shorter board 105 on the opposite outermost side. Often these boards 105 are of different widths.

Figure 6:
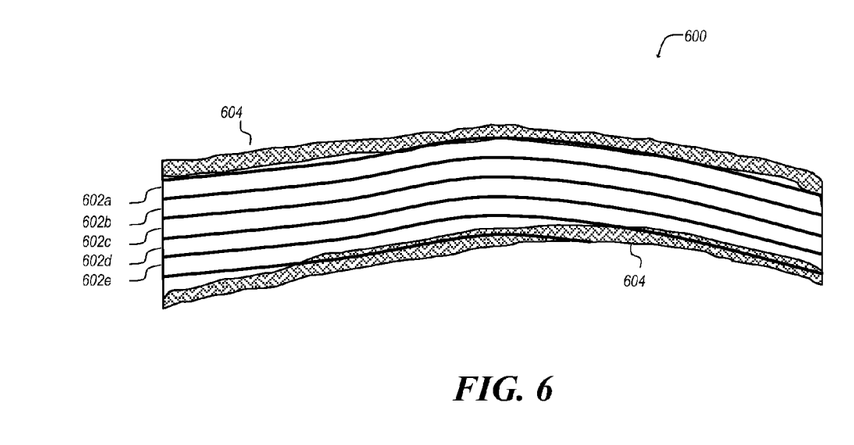
FIG. 6 is a top plan view of an examplary cant curve sawing solution to produce a number of boards.
Figure 7:
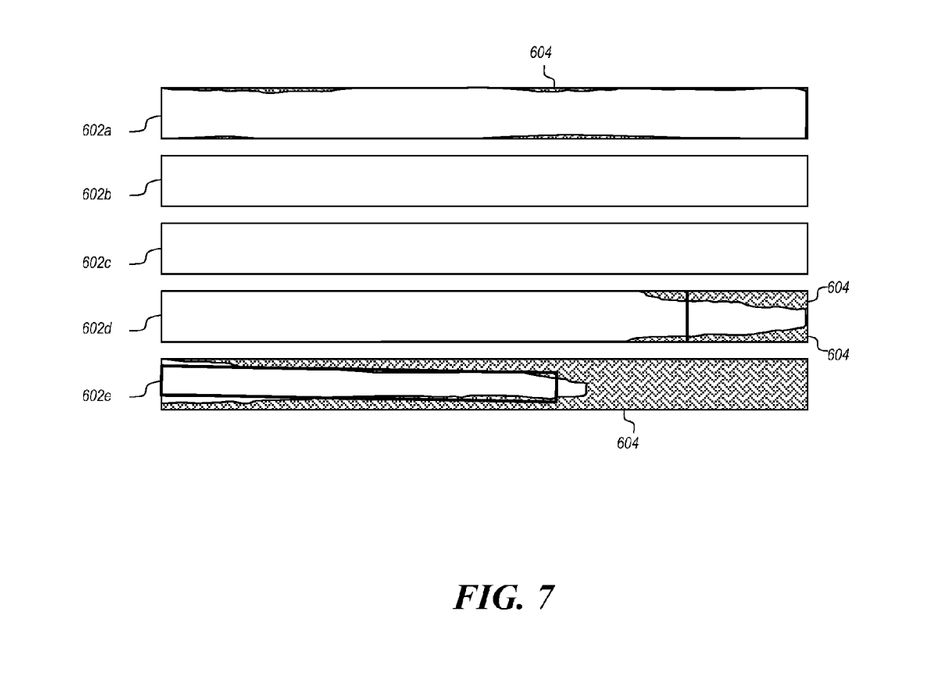
FIG. 7 is a top plan view of the number of boards produced by the examplary cant curve sawing solution illustrated in FIG. 6, where the boards are oriented wane side up, in side-by-side relationship to better illustrate wane and the need to trim and/or edge certain ones of the boards.

FIG. 6 shows an example of a cant 600 that has been processed using a modern curve sawing gang. In this example, there are five boards 602a-602e (collectively 602) which can be sawn from the cant 600. Some of the boards 602 have wane 604. If placed wane up and side-by-side, the boards 602 may look like as illustrated in FIG. 7.

In this example, a first outermost board 602a has some wane 604. This wane 604 may be within some acceptable amount and/or position of wane, as defined by one or more wane rules. Since the wane 604 on board 602a is acceptable, the board 602a does not need to be trimmed or edged, and this is a full length board. The next two successive boards 602b, 602c are inner boards and do not have any wane. Thus boards 602b, 602c do not need to be trimmed or edged, and these are full length, full width boards. The next successive board 602d is an inner board and has notable wane 604 proximate one end, but generally very little wane 604 along opposed edges. While the wane 604 along the edges may be within some acceptable amount and/or position of wane, as defined by one or more wane rules, the wane 604 proximate the end of board 602d may not be acceptable. Thus, the board 604d does not need to be edged, but will be trimmed due to the unacceptable or excessive wane 604 proximate the end of the board 602d. Consequently board 604d will be a full width board, but not a full length board. The next successive board 602e is an outermost board and has notable wane 604 proximate one end and generally along both opposed edges. The wane 604 proximate the end and/or along the edges of board 602e may not be acceptable as defined by one or more wane rules. Thus, the board 604e will be trimmed and edged. Consequently, board 604e will not be a full length board or a full width board.

The optimizer auditing system 130 (FIG. 1) relies on the fact that, if the cant optimizer system 116 (FIG. 1) has performed well, then the outermost board 602a will be at a wane limit, so that boards 602d and 602e opposed across the cant 600 from the outermost board 602a are as long and as wide as possible. This maximizes total recovery from the cant 600. If the outermost board 602a has less wane 604 than allowed under the applicable wane rule(s), additional recovery could have been obtained from the cant 600 using a different sawing solution. Hence, the cant optimizer system 120 is not performing as desired.

The optimizer auditing system 130 (FIG. 1) determines whether additional recovery could have been obtained from a cant 600. As an overview, the optimizer auditing system 130 simulates other sawing solutions, computationally recomputing a geometry of the boards 602 as if sawn with the sawn faces moved left and right through a number of increments or distances. For example, results from moving the sawn faces plus or minus 0.25 inches and in 0.05 inch increments can be computed. Using those values, the optimizer auditing system 130 would compute a total of 10 alternate sawing solution positions, 5 on either side of the actual sawing solution position. Other values of distances and numbers of increments may be employed.

To be clear, these alternative sawing solutions are virtual solutions, in that these alternative sawing solutions are not actually used to saw a cant 600 into boards 602. In fact, these alternative sawing solutions are most likely generated after the cant 600 has already been sawn into boards 602. Thus, the optimizer auditing system 130 is computationally generating computer or digital models of the results of various possible sawing solutions.

In order to computationally simulate the boards 602 that would result from these alternative sawing solutions, the optimizer auditing system 130 extrapolates the wane 604 that is detected or seen in the acquired image data in order to predict the geometry of the resulting boards 602.

Figure 8:
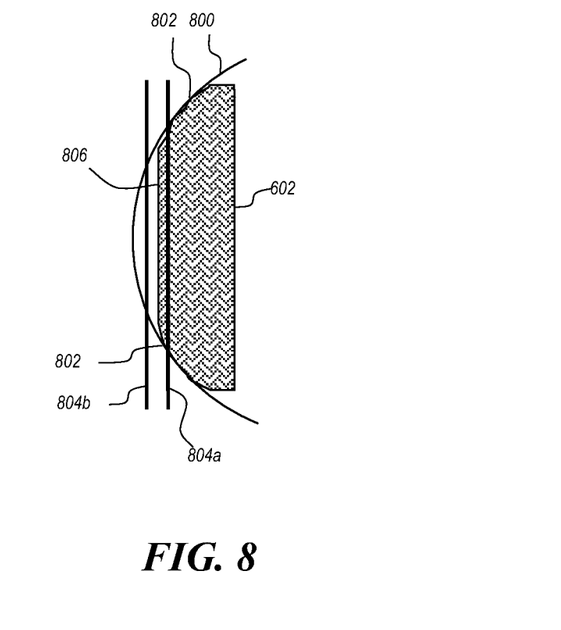
FIG. 8 is a schematic illustration of a fitting of splines or curves to a sensed wane performed by an optimizer auditing computer as part of determining a geometry of an original log from which a cant was sawn, according to one illustrated embodiment.

FIG. 8 shows an example of how the optimizer auditing system 130 can extrapolate the wane 604 that is detected or seen in the acquired image data in order to predict the geometry of the resulting boards 602. The optimizer auditing system 130 can accomplish such by fitting splines or curves (e.g., non-rational b-splines, ellipses) 800 to the visible wane 802. The optimizer auditing system 130 then computes the expected wane as if the saw blades had been cutting at an incremental distance on the outside 804a and/or at an incremental distance on an inside 804b of the actual sawn surfaces 806. Notably, the spline or curve 800 fits the visible wane 802. While only two incremental distances are shown, additional incremental distances may be employed, for instance 5 increments in each direction from the sawn surface 806. The spline or curve is, again, a computer generated construct, and may be represented using a variety of mathematical techniques including basis splines and non-uniform rational b-splines.

If the predicted lumber increases when the boards are moved in either the left or right direction, we know that the cant optimizer system did not achieve maximum recovery on that particular cant.

At 502, the acquisition device(s) 134 (FIG. 1) of the optimizer auditing system 130, for example planar laser scanners 208 (FIGS. 2 and 3), scan the geometry of the boards 602 emerging from a gangsaw 108 (FIG. 1), 200 (FIG. 2). The image data or geometrical information may include a size and/or a shape of wane 204 (FIG. 2), 604 (FIGS. 6 and 7) on the boards 105 (FIGS. 2 and 3), 602 (FIGS. 6 and 7). The wane may correspond to a portion of a piece missing from a board due to an outside shape of the original log 101a (FIG. 1).

Figure 5:
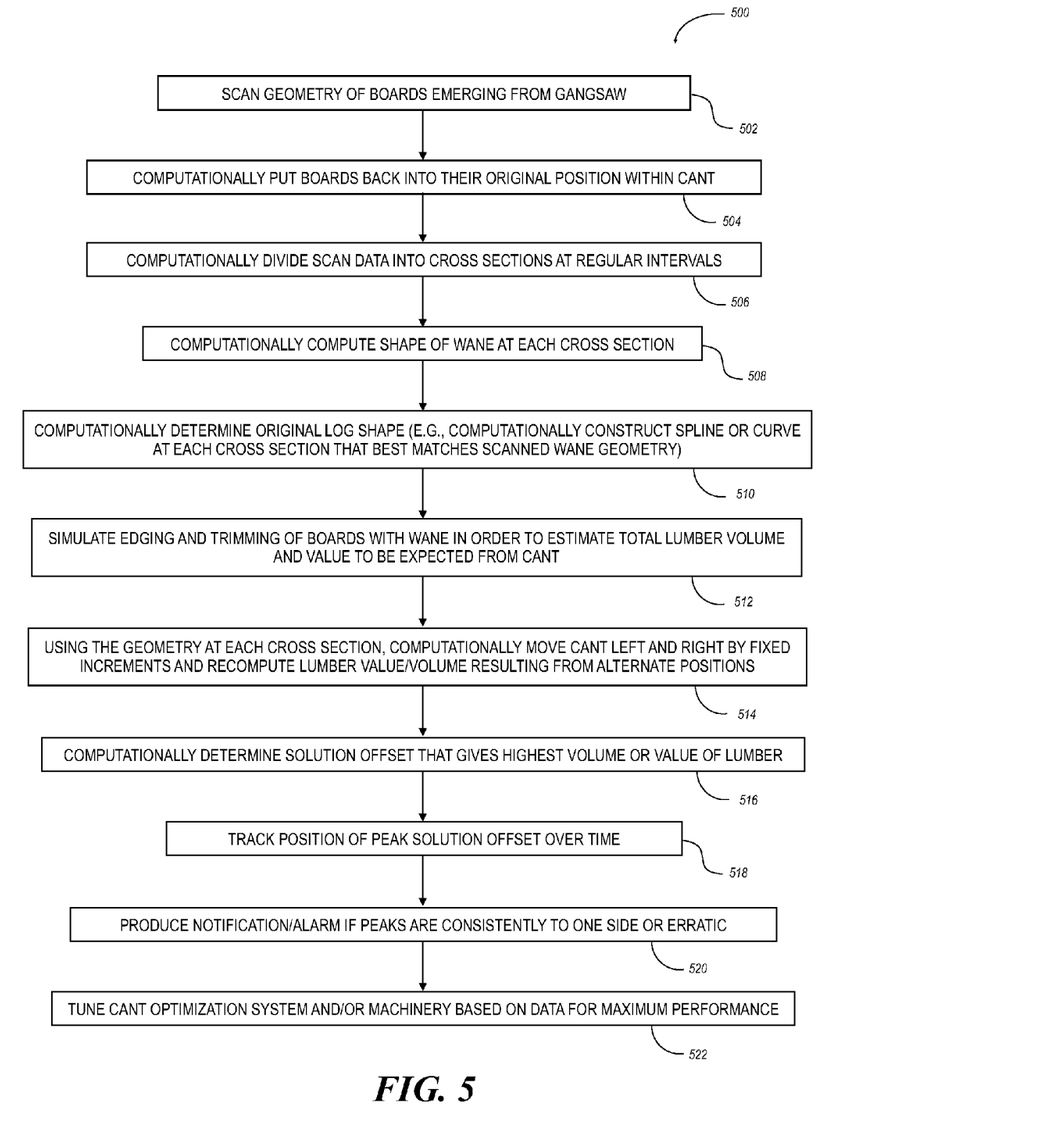
FIG. 5 is a flow diagram of a method of operation of an optimizer auditing system, according to one illustrated embodiment.

At 504, the optimizer auditing system 130 computationally puts the boards back into their original positions within the cant 600 (FIGS. 6 and 7), for example rotating the same as necessary. Again, in the interest of clarity, the optimizer auditing system 130 is performing a simulation using a virtual or computer model of the boards 602, rather than actually physically manipulating the boards 105 (FIGS. 1-3) that resulted from the actual physical sawing operation.

At 506, the optimizer auditing system 130 computationally divides the scan data into cross sections, typically at regular intervals or incremental distances. A suitable interval or distance may, for example, be 1.0 inch. Other intervals or distances may be employed.

At 508, the optimizer auditing system 130 computationally computes a shape of the wane at each cross section. Such is best illustrated in FIG. 8 and described above in reference to FIG. 8.

At 510, the optimizer auditing system 130 computationally constructs at each cross section a spline or curve (e.g., b-spline, ellipse) that best matches the scanned wane geometry. Again, the curve is a computational object represented rather than a physical tangible object. In constructing the splines or curves, the optimizer auditing system 130 is computationally determining an original shape of a log 101a from which the cant 103 (FIG. 1), 600 (FIGS. 6 and 7) was sawn.

At 512, in order to estimate a total lumber volume and/or value which could have been generated from a particular cant 103 (FIG. 1), 600 (FIGS. 6 and 7), the optimizer auditing system 130 computationally simulates edging and trimming of the resulting simulated boards, that would be used to comply with any requirements for the lumber, for example wane rules. The optimizer auditing system 130 may use any method to perform the estimation. Preferably, the method employed by the optimizer auditing system 130 will be identical or at least similar to the method employed by the cant optimizer computer 120.

At 514, using the geometry at each cross section, the optimizer auditing system 130 computationally moves the cant left and right by fixed increments, and recomputes the lumber volume or value from the alternate positions. As noted above, 0.05 inches may, for example, be a suitable increment. Other size increments may be employed. The value may take into account the current lumber prices, which generally are associated with various dimensions of the resulting lumber, such as length, width and thickness, and which may also reflect a grade of lumber including, for instance, an amount of wane on each board.

At 516, the optimizer auditing system 130 computationally determines which computed solution offset would have resulted in a highest volume and/or value of lumber. For example, the optimizer auditing system 130 may compare the volumes and/or values computed for each of the various computed offset solutions.

Optionally at 518, the optimizer auditing system 130 computationally tracks a position of peak solution offsets over time. Thus, the optimizer auditing system 130 can identify trends in a divergence of the operation or performance of the cant optimizer system 116 (FIG. 1) from desired performance. From the tracking or trends, the optimizer auditing system 130 may be able to identify a source of the divergence, for example a problem with particular hardware, and/or identify a potential solution to remedy the divergence. A limited list of possible problems or sources of error include, for example: 1) dirty laser scanners, 2) incorrect laser scanner calibration, 3) incorrect cant positioning, 4) incorrect cant transport, 5) machine (e.g., gangsaw) misalignment, 6) incorrect hold-down roll pressures, 7) roll sequencing errors, 8) incorrect saw and/or chip head positioning, 9) software problems, and 10) incorrect parameter settings.

Optionally at 520, the optimizer auditing system 130 generates, produces or issues a notification or alarm. For example, the optimizer auditing system 130 may generate, produce or issue a notification or alarm if the peaks are consistently to one side, or are erratic. The notification or alarm may take a variety of forms. For example, notification or alarm may take the form of a visual notification or alarm and/or an aural notification or alarm. The notification or alarm may be produced at the optimizer auditing system 130, at the machinery that is optimized, at the machinery that is out of compliance, or may be transmitted to a central location or to distributed locations, for instance via cell phone or smartphones.

Optionally at 522, the optimizer auditing system 130 or the end user may tune the cant optimizer system 116 (FIG. 1) using or based on the data generated by the optimizer auditing system 130 in order to improve or achieve maximum performance of the cant optimizer system 116.

Figure 9:
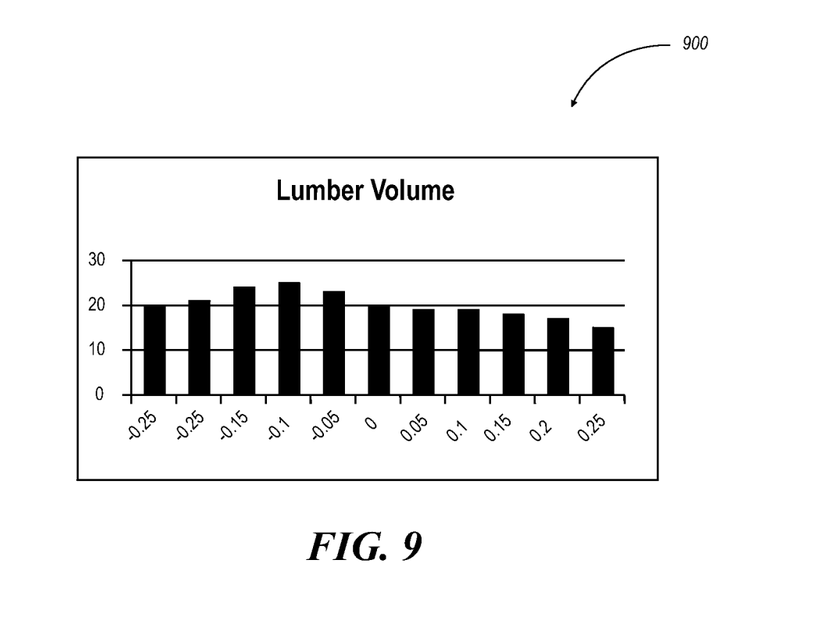
FIG. 9 is a graph or chart showing recovery as a function of board shift for each cant over a period of time.

FIG. 9 shows an examplary graph 900 of recovery as a function of board shift for each cant.

Shifts in cutting solutions are represented along a horizontal axis, in this example in units of 0.05 inch to the left and to the right of center, where center represents the cutting solution selected by the cant optimizer system and actually employed to saw the cant. The volume or value of recovery is represented along a vertical axis, in this example in units of percentage increase in recovery. While not illustrated, decrease in recovery could also be represented.

In this example, maximum lumber recovery would occur by shifting the boards to the left by a tenth of an inch. If the cant optimizer system 116 (FIG. 1) was doing a good job of producing cutting solutions for the cants, but the gang transport or positioning equipment had a bias, then peak recovery would appear consistently to one side (e.g., left, right) of center over a given time period. However, if the cant optimizer system 116 was not performing well, for instance due to scanning accuracy issues or parameter settings, peak values would shift back and forth erratically or randomly from cant to cant.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information can be stored on any computer readable medium for use by or in connection with any computer and/or processor related system or method. In the context of this document, a memory is a computer readable medium that is an electronic, magnetic, optical, or other physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but is not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Pat. Nos. 7,853,349; 7,866,642; U.S. patent application Ser. No. 11/873,090 filed Oct. 16, 2007; U.S. patent application Ser. No. 12/424,402 filed Apr. 15, 2009 and U.S. provisional patent application Ser. No. 61/450,011 filed Mar. 7, 2011 are incorporated herein by reference, in their entirety. Aspects of the embodiments can be modified, if necessary, to employ systems, circuits and concepts of the various patents, applications and publications to provide yet further embodiments.

For example, the teachings herein may be combined with those of U.S. patent application Ser. No. 12/424,402, filed Apr. 15, 2009 and published as US-2009-0255607. That application illustrates (e.g., FIGS. 7-12) several approaches to scanning the geometry of the lumber coming from a cant. That application teaches how to analyze geometry of boards and to combine the board geometry with matching sideboard information in order to evaluate the entire sawmill performance.

Different arrangements of laser scanners may also be used to determine geometric characteristics of the boards. The laser scanners may also be positioned at still other locations downstream from the gangsaw. Different imaging systems other than laser scanners may alternatively or additional be used. The light source may comprise another collimated, non-laser light source or another, more diffuse source of electromagnetic radiation. The image sensor may also take variety of other forms.

The various embodiments described above can be combined to provide further embodiments. From the foregoing it will be appreciated that, although specific embodiments have been described herein for purposes of illustration, various modifications may be made without deviating from the spirit and scope of the teachings. Accordingly, the claims are not limited by the disclosed embodiments.

The invention claimed is:

1. A method of automated auditing of sawmill operation, the method comprising:
  acquiring via at least one sensor a set of geometrical information from a number of pieces of lumber following at least partial completion of a sawing operation that forms the number of pieces of lumber from a log or cant;
  computationally determining by at least one processor original shape of the log or cant based at least in part on the acquired set of geometrical information;
  computationally simulating by at least one processor two or more simulated sawing solutions based at east in part on the original shape of the log or cant; and
  computationally determining by at least one processor a simulated amount of recovery from the log or cant for a given one of the simulated sawing solutions, wherein the given one of the simulated sawing solutions is different from an actual sawing solution used in the sawing operation.

2. The method of claim 1, further comprising:
for the given one of the simulated sawing solutions, computationally comparing the determined simulated amount of recovery from the log or cant to an actual amount of recovery from the log or cant, wherein the actual amount of recovery corresponds to at least one of a volume or a value of lumber produced from the log or cant by the actual sawing solution used in the sawing operation, and wherein the determined simulated amount of recovery from the log or cant corresponds to at least one of a volume or a value of lumber that would have been produced from the log or cant by use of the given one of the simulated sawing solutions.

3. The method of claim 2, further comprising:
providing an indication of a variation between the determined simulated amount of recovery from the log or cant and the actual amount of recovery from the log or cant.

4. The method of claim 2, further comprising:
providing a notification if a variation between the determined simulated amount of recovery from the log or cant and the actual amount of recovery from the log or cant exceeds a defined threshold.

5. The method of claim 2, further comprising:
stopping operation of a piece of sawing equipment if a variation between the determined simulated amount of recovery from the log or cant and the actual amount of recovery from the log or cant exceeds a defined threshold.

6. The method of claim 2, further comprising:
adjusting operation of at least one of a piece of sawing equipment or an optimizer system that is controllably coupled to the piece of sawing equipment based at least in part on a comparison between the determined simulated amount of recovery from the log or cant and the actual amount of recovery from the log or cant.

7. The method of claim 1 wherein acquiring via at least one sensor a set of geometrical information from a number of pieces of lumber following at least partial completion of a sawing operation that forms the number of pieces of lumber from a log or cant includes optically acquiring geometrical information from a plurality of boards downstream of a gangsaw.

8. The method of claim 1 wherein the given one of the simulated sawing solutions includes a saw path spaced perpendicularly from a sawn face of a given one of the number of pieces of lumber in at least one direction by a defined distance.

9. The method of claim 8 wherein the given one of the simulated sawing solutions is an edging or trimming operation.

10. The method of claim 9 wherein computationally simulating by at least one processor the given one of the simulated sawing solutions includes computationally simulating by at least one processor the given one of the simulated sawing solutions based at least in part on a number of wane rules.

11. The method of claim 1 wherein computationally determining by at least one processor a simulated amount of recovery from the log or cant for a given one of the simulated sawing solutions includes taking into account a price of lumber.

12. The method of claim 1 wherein computationally determining by at least one processor a simulated amount of recovery from the log or cant for given one of the simulated sawing solutions includes taking into account a number of wane rules.

13. The method of claim 1 wherein the number of pieces of lumber includes two or more pieces of lumber, and wherein computationally determining by at least one processor an original shape of the log or cant based at least in part on the acquired set of geometrical information includes arranging virtual representations of the respective pieces of lumber into positions corresponding to positions of the respective pieces of lumber within the log or cant.

14. A method of automated auditing of sawmill operation, the method comprising:
acquiring via at least one sensor a contour of wane on an outermost one of two or more pieces of lumber following at least partial completion of a sawing operation that forms the pieces of lumber from a log or cant;
computationally fitting by at least one processor a curve to the contour of wane;
computationally simulating by at least one processor two or more simulated sawing solutions based at least in part on the curve; and
computationally determining by at least one processor a simulated amount of recovery from the log or cant for a given one of the simulated sawing solutions, wherein the given one of the simulated sawing solutions is different from an actual sawing solution used in the sawing operation.

15. The method of claim 14 wherein the curve is a basis spline and the method further comprises:
computationally constructing a simulated cant based at part on image data representing the pieces of lumber.

16. The method of claim 15 wherein the given one of simulated sawing solutions is a first simulated sawing solution, wherein the two or more simulated sawing solutions include a second simulated sawing solution, and wherein the first and second simulated sawing solutions include different respective sawing increments spaced perpendicularly in two directions from a location of a sawn face of a given one of the pieces of lumber in the simulated cant.

17. The method of claim 14, further comprising:
for the given one of the simulated sawing solutions, computationally comparing the determined simulated amount of recovery from the log or cant to an actual amount of recovery from the log or cant, wherein the actual amount of recovery corresponds to at least one of a volume or a value of lumber produced from the log or cant by the actual sawing solution used in the sawing operation, and wherein the determined simulated amount of recovery from the log or cant corresponds to at least one of a volume or a value of lumber that would have been produced from the log or cant by use of the given one of the simulated sawing solutions.

18. The method of claim 17, further comprising:
providing an indication of a variation between the determined simulated amount of recovery from the log or can and the actual amount of recovery from the log or cant.

19. The method of claim 17, further comprising:
providing a notification if a variation between the determined simulated amount of recovery from the log or cant and the actual amount of recovery from the log or cant exceeds a defined threshold.

20. The method of claim 17, further comprising:
stopping operation of a piece of sawing equipment if a variation between the determined simulated amount of recovery from the log or cant and the actual amount of recovery from the log or cant exceeds a defined threshold.

21. The method of claim 17, further comprising:
adjusting operation of at least one of a piece of sawing equipment or an optimizer system that is controllably coupled to the piece of sawing equipment based at least in part on a comparison between the determined simulated amount of recovery from the log or cant and the actual amount of recovery from the log or cant.

* * * * *

UNITED STATES PATENT AND TRADEMARK OFFICE
CERTIFICATE OF CORRECTION

PATENT NO.         : 9,505,072 B2                                  Page 1 of 1
APPLICATION NO.    : 13/366028
DATED              : November 29, 2016
INVENTOR(S)        : Earl Barker It is certified that error appears in the above-identified patent and that said Letters Patent is hereby corrected as shown below:

In the Specification

In Column 5, Line 63, delete "examplary" and insert -- exemplary --, therefor.

In Column 5, Line 66, delete "examplary" and insert -- exemplary --, therefor.

In Column 6, Line 58, delete "examplary" and insert -- exemplary --, therefor.

In Column 12, Line 1, delete "micro processor" and insert -- microprocessor --, therefor.

In Column 16, Line 60, delete "examplary" and insert -- exemplary --, therefor.

In Column 17, Line 35, delete "and or" and insert -- and/or --, therefor.

In the Claims

In Column 18, Line 60, in Claim 1, before "original" insert -- an --.

In Column 20, Line 1, in Claim 12, before "given" insert -- a --.

In Column 20, Line 61, in Claim 18, delete "can" and insert -- cant --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*